United States Patent Office.

JOHN FARREL, OF NEW YORK, N. Y.

Letters Patent No. 111,114, dated January 24, 1871.

---

IMPROVEMENT IN FLUX FOR WELDING STEEL OF HIGH AND LOW GRADES.

---

The Schedule referred to in these Letters Patent and making part of the same.

---

Be it known that I, JOHN FARREL, of the city, county, and State of New York, have invented or discovered a new Flux for Welding Steel of High and Low Grades, and the following is a specification thereof.

The ultimate object of my invention is to obtain a welded steel plate composed of steel of high and low grades; and in the course of my experiments I have ascertained that the best flux for welding together the component parts of such plate is composed of the following materials in about the proportions named:

| | |
|---|---:|
| Magnetic iron ore | 40 |
| Silicic acid | 38 |
| Protoxide of iron | 10 |
| Magnesia | 5 |
| Potash | 2 |
| Lime | 2 |
| Alumina | 3 |
| | 100 |

My invention also relates to the improved compound plate of high and low steel, having the parts thereof arranged, combined, and welded, substantially as herein specified.

Hitherto, the metal plate used in safes called burglar-proof have been chiefly of steel and iron welded, and, in some instances, steel of varying hardness; but in the latter case, however, invariably with a soft core or center and hard outer surface.

My improved plate is distinguished in having one or more surfaces of soft, or non-carbon, or low steel, combined with one or more hard interior portions or cores of high or carbon steel, the purpose being to envelope one or more hard steel plates, impenetrable to the drill, within one or more protecting layers of tough steel, which cannot be fractured.

The method of making and using the flux hereinbefore referred to, and the mode of procedure in forming the combination steel plates therewith, are as follows:

I take the several materials mentioned and separately reduce them to powder nearly impalpable. They are then thoroughly commingled by passing several times through a fine sieve, when the flux is ready for use. I now take a number of bars or plates of any grade of soft or low steel that will not receive a high temper, and also an equal or nearly equal number of plates or bars, similar in size and thickness— say half an inch thick—of high steel, carbon, chrome, or any grade that will harden readily and take a high temper. All these plates or bars are next thoroughly coated with my improved flux, after which I form a pile or billet by placing the bars of high and low steel one upon the other, arranging them in alternate layers of high and low steel. The billet or pile so made is then placed in a furnace, and when heated to the proper temperature withdrawn and welded, by hammering, rolling, or otherwise, until the entire billet is reduced to a half or three-eighths of an inch in thickness. After the plate so made is cut and formed to the proper size and shape for the purpose intended it is heated to a cherry-red and plunged into a cold bath. This hardens and tempers only those portions of the plate composed of high steel, while those of low steel are greatly improved, resulting in a new article of combination steel-plate of great superiority for the lining and walls of safes, vaults, and vault-doors, to resist the operation of drills and other cutting tools, or the force of direct blows.

An inferior article may be made with borax and other common fluxes, but when welded with my new flux the metal itself is much improved, while the union of the two qualities is incomparably strong and perfect.

I do not confine myself to the precise proportions specified of the ingredients of my improved flux.

I claim as new and desire to secure by Letters Patent—

1. The within-described flux for welding high and low steel, substantially as described.

2. High and low steel welded together with the flux described, or the equivalent thereof, substantially as specified.

JOHN FARREL.

Witnesses:
EARLE H. SMITH,
JOHN L. ROBERTS, Jr.